US012637347B1

(12) United States Patent
Storch

(10) Patent No.: US 12,637,347 B1
(45) Date of Patent: May 26, 2026

(54) ENERGY AND WASTE SAVING DEVICE FOR HOUSEHOLD BEER CHILLING DEVICES HAVING REMOTE DISPENSING LINES

(71) Applicant: Felix Storch, Inc., Bronx, NY (US)

(72) Inventor: Paul Storch, Bronx, NY (US)

(73) Assignee: Felix Storch, Inc., Bronx, NY (US)

( * ) Notice: Subject to any disclaimer, the term of this patent is extended or adjusted under 35 U.S.C. 154(b) by 104 days.

(21) Appl. No.: 18/895,571

(22) Filed: Sep. 25, 2024

(51) Int. Cl.
*B67D 1/12* (2006.01)
*B67D 1/08* (2006.01)

(52) U.S. Cl.
CPC ......... *B67D 1/1202* (2013.01); *B67D 1/0857* (2013.01); *B67D 1/0888* (2013.01); *B67D 2001/0822* (2013.01)

(58) Field of Classification Search
CPC .. B67D 1/1202; B67D 1/0857; B67D 1/0888; B67D 2001/0822; F25D 31/002
See application file for complete search history.

(56) References Cited

U.S. PATENT DOCUMENTS

| | | | | | | |
|---|---|---|---|---|---|---|
| 2,583,982 | A | * | 1/1952 | Zwosta | B67D 1/07 | 15/302 |
| 3,221,936 | A | * | 12/1965 | Spinuzza | B67D 1/0888 | 222/61 |
| 3,822,716 | A | * | 7/1974 | Martin | B67D 1/0832 | 137/212 |
| 4,730,463 | A | * | 3/1988 | Stanfill | B67D 1/0867 | 62/399 |
| 4,997,012 | A | * | 3/1991 | Kuziw | B67D 1/1234 | 222/77 |
| 5,007,560 | A | * | 4/1991 | Sassak | B67D 1/04 | 222/2 |
| 5,009,082 | A | * | 4/1991 | Abraham, III | B67D 1/0867 | 62/390 |
| 5,564,602 | A | * | 10/1996 | Cleland | F28D 7/0016 | 222/399 |
| 5,636,763 | A | * | 6/1997 | Furness | B67D 1/1245 | 222/61 |
| 5,694,787 | A | * | 12/1997 | Cleleand | B67D 1/16 | 62/396 |
| 6,029,854 | A | * | 2/2000 | Wissen | B67D 1/0004 | 222/63 |
| 6,216,918 | B1 | * | 4/2001 | Saveliev | B67D 1/0867 | 422/186.3 |
| 6,598,417 | B1 | * | 7/2003 | Wilkes | F25D 17/02 | 62/390 |

(Continued)

*Primary Examiner* — Dariush Seif
(74) *Attorney, Agent, or Firm* — Richard M. Goldberg

(57) ABSTRACT

A beer dispensing system includes a kegerator under a countertop for holding a beer keg; a beer tower above the countertop and having a tap for dispensing the beer; a dispensing line between the keg and the tap for supplying beer from the keg to the tap; a drain line for draining beer in the dispensing line during non-use; a valve selectively movable between a first position connecting the dispensing line to the drain line and disconnecting the dispensing line to the tap, during non-use and a second position connecting the dispensing line between the keg and the tap and disconnecting the dispensing line to the drain line, during use of the beer dispensing system; and a mounting base mounted on and around the countertop for directing the dispensing line around the countertop for connection between the keg and the tap.

11 Claims, 4 Drawing Sheets

(56) References Cited

U.S. PATENT DOCUMENTS

| | | | | | |
|---|---|---|---|---|---|
| 6,648,025 | B2 * | 11/2003 | Smith | B67D 1/0007 | 141/2 |
| 6,669,051 | B1 * | 12/2003 | Phallen | B67C 3/28 | 222/394 |
| 7,131,560 | B2 * | 11/2006 | Hammond | B67D 1/0406 | 222/400.7 |
| 7,373,784 | B2 * | 5/2008 | Haskayne | B67D 1/0862 | 222/146.6 |
| 8,833,405 | B2 * | 9/2014 | Phallen | G05D 7/0652 | 141/94 |
| 9,027,792 | B2 * | 5/2015 | Watts | B67D 1/0412 | 222/108 |
| 10,562,753 | B2 * | 2/2020 | Valles | B67D 1/0845 | |
| 10,752,486 | B2 * | 8/2020 | Chao | B67D 1/0431 | |
| 10,787,357 | B2 * | 9/2020 | Giarratano | B67D 1/0857 | |
| 11,091,360 | B2 * | 8/2021 | Christiansen | B67D 1/1225 | |
| 11,161,729 | B2 * | 11/2021 | Volftsun | B67D 1/0878 | |
| 11,161,730 | B1 * | 11/2021 | Volftsun | B67D 1/0007 | |
| 11,655,134 | B1 * | 5/2023 | Perkins | B67D 1/0003 | 222/129.1 |
| 12,497,280 | B1 * | 12/2025 | Ward | B67D 1/07 | |
| 2002/0088823 | A1 * | 7/2002 | Tabacchi | B67D 1/1234 | 222/52 |
| 2004/0099688 | A1 * | 5/2004 | Davis | B67D 1/0044 | 222/145.1 |
| 2006/0157515 | A1 * | 7/2006 | Oswald | B67D 1/07 | 222/399 |
| 2007/0051125 | A1 * | 3/2007 | Chiusolo | F25D 3/02 | 62/399 |
| 2008/0178607 | A1 * | 7/2008 | Schneller | B67D 1/0872 | 62/393 |
| 2010/0243676 | A1 * | 9/2010 | Bax | B67D 1/07 | 222/400.7 |
| 2011/0011108 | A1 * | 1/2011 | Chadwell | B67D 3/0077 | 62/115 |
| 2013/0056495 | A1 * | 3/2013 | Watts | B67D 1/0857 | 222/399 |
| 2013/0126009 | A1 * | 5/2013 | Killarney | F16K 51/00 | 137/315.01 |
| 2014/0151402 | A1 * | 6/2014 | Jannatkhah | A47F 9/00 | 222/399 |
| 2017/0233238 | A1 * | 8/2017 | Bryant | B67D 1/0406 | 62/126 |
| 2018/0127259 | A1 * | 5/2018 | Wiseberg | A47J 43/27 | |
| 2019/0144254 | A1 * | 5/2019 | Hutchinson | B67D 1/0829 | 222/1 |
| 2021/0139309 | A1 * | 5/2021 | Alpmen | G06Q 30/0631 | |
| 2021/0261400 | A1 * | 8/2021 | Danielson | B67D 1/0888 | |
| 2021/0323805 | A1 * | 10/2021 | OHara | B67D 1/06 | |
| 2022/0144616 | A1 * | 5/2022 | Bach | B67D 1/0462 | |
| 2022/0144619 | A1 * | 5/2022 | Otto | B67D 1/0024 | |
| 2024/0101407 | A1 * | 3/2024 | Kudirka | B67D 1/0834 | |
| 2024/0317568 | A1 * | 9/2024 | Benayas Pérez | B67D 3/041 | |
| 2026/0042653 | A1 * | 2/2026 | Kuo | B67D 1/0017 | |

* cited by examiner

ENERGY AND WASTE SAVING DEVICE FOR HOUSEHOLD BEER CHILLING DEVICES HAVING REMOTE DISPENSING LINES

BACKGROUND OF THE INVENTION

The present invention is directed to an energy and waste saving device for household beer chilling devices having remote dispensing lines, and more particularly, is directed to such an arrangement for use with a refrigerated chamber or kegerator under a countertop.

Draft beer stored in kegs often lacks pasteurization found in cans and bottles and must be kept chilled to prevent fermentation. This presents a challenge for kegs stored remotely where there is a dispensing line comprised of a long length of tube between the keg and the dispensing faucet or tap. In other words, after beer has been dispensed, beer remains in the dispensing line between the keg and the faucet at room temperature.

Thus, even if the keg is stored in a cooling refrigerator chamber or kegerator, the dispensing line between the keg and the dispensing faucet must also be chilled. If the dispensing line is not chilled, and there is a sufficient time between dispensing intervals, the dispensed beer during the next interval will result in the spoiled beer from the dispensing line being dispensed. Unpasteurized beer that is left at room temperature for a period of time becomes excessively foamy and warm, and can have a build up of bacteria.

In commercial applications such as restaurants and bars, there are numerous systems, often glycol based, to continuously cool beer dispensing lines, in order to avoid this problem. As a result, the beer that is dispensed is never spoiled.

However, in household systems, such systems to cool the beer dispensing lines are generally not provided, and are cost prohibitive. As a result, it is generally necessary to discard an initial batch of spoiled beer which is dispensed after an interval of non-use. This means that the faucet or tap is actuated to dispose of the spoiled beer. However, this results in additional non-spoiled beer being discarded with the spoiled beer. In other words, since it is not clear after activating the tap when all spoiled beer has been discarded, this results in additional unspoiled beer being discarded as well. This results in a waste of beer and energy.

In addition, household beer dispensing systems are generally self-contained, and the beer flows directly to the tap. In such household systems, a beer cooler or kegerator is provided to hold and cool a keg of beer. The beer cooler is generally installed in a built-in setting, under a countertop or bartop, with the faucet or tap positioned above the countertop or bartop. This, however, requires cutting holes in the countertop to pass the dispensing line from the keg to the tap, thereby rendering the countertop unusable for any other appliance or cabinet at a later date. Further, oftentimes, contractors do not drill the holes correctly, and must drill additional holes.

SUMMARY OF THE INVENTION

Accordingly, it is an object of the present invention to provide a beer dispensing system that overcomes the aforementioned problems.

It is another object of the present invention to provide a beer dispensing system of the type including a kegerator and a dispensing line connected between the kegerator and a tap, in which any beer remaining in the dispensing line after dispensing of beer from the tap, is adapted to be drained to a drain line.

It is yet another object of the present invention to provide a beer dispensing system including a valve connecting the dispensing line and the drain line to selectively control opening and closing of the dispensing line or the drain line.

It is a further object of the present invention to provide a beer dispensing system in which the valve is manually controlled.

It is a still further object of the present invention to provide a beer dispensing system in which the valve is automatically controlled to connect the dispensing line to the drain line after a predetermined period of non-use in order to drain the beer from the dispensing line to the drain line.

It is a yet further object of the present invention to provide a beer dispensing system in which the drain line is connected to a secondary container inside the refrigerated chamber.

It is another object of the present invention to provide a beer dispensing system including a mounting base that snakes the dispensing line from the keg around the countertop to the faucet, thereby eliminating the need to drill any holes in the countertop.

It is still another object of the present invention to provide a beer dispensing system in which the faucet or tap is connected to the mounting base.

In accordance with an aspect of the present invention, a beer dispensing system includes a refrigerated chamber for holding a keg of beer; a beer tower having at least one tap for dispensing the beer from the keg; a dispensing line extending between the keg in the refrigerated chamber and the at least one tap for supplying beer from the keg to the tap; a drain line for draining beer in the dispensing line during non-use of the beer dispensing system; and a valve which selectively provides connections between a first position which connects the dispensing line to the drain line and disconnects the dispensing line to the tap, during non-use of the beer dispensing system and a second position which connects the dispensing line between the keg and the tap and disconnects the dispensing line to the drain line, during use of the beer dispensing system.

Preferably, the valve is a three way ball valve.

There is further provided a switch for electronically controlling movement of the valve between the first and second positions. Preferably, the switch is positioned on the beer tower.

The switch can be wired directly to the ball valve for controlling the position of the ball valve between the first and second positions. Alternatively, the switch is arranged to transmit a signal to be received by the ball valve for controlling the position of the ball valve between the first and second positions.

The valve is connected to the dispensing line at a position where the dispensing line immediately exits the refrigerated chamber.

A secondary container is connected with the drain line for receiving beer discarded from the dispensing line to the drain line.

In accordance with another aspect of the present invention, a beer dispensing system includes a refrigerated chamber for holding a keg of beer, wherein the refrigerated chamber is positioned below a countertop; a beer tower having at least one tap for dispensing the beer from the keg, wherein the beer tower is positioned above the countertop; a dispensing line extending between the keg in the refrigerated chamber and the at least one tap for supplying beer from the keg to the tap; and a mounting base mounted on and around the countertop for directing the dispensing line around the countertop for connection between the keg and the at least one tap, without passing through the countertop.

The mounting base includes a hollow upper housing that sits on top of the countertop and a guide wall downwardly extending from the upper housing at an edge of the countertop for guiding the dispensing line around the countertop.

The upper housing includes a top wall having an opening therein, and the beer tower is positioned on and secured to the top wall in surrounding relation and in open communication with the opening.

The guide wall is an L-shaped wall that guides the dispensing line from the upper housing, down around the edge of the countertop and toward a gap between the refrigerated chamber and a lower surface of the countertop. Further, the mounting base is not secured to the countertop.

In accordance with still another aspect of the present invention, a beer dispensing system includes a refrigerated chamber for holding a keg of beer, wherein the refrigerated chamber is positioned below a countertop; a beer tower having at least one tap for dispensing the beer from the keg, wherein the beer tower is positioned above the countertop; and a dispensing line extending between the keg in the refrigerated chamber and the at least one tap for supplying beer from the keg to the tap. A drain line is proivded for draining beer in the dispensing line during non-use of the beer dispensing system. A valve selectively provides connections between a first position which connects the dispensing line to the drain line and disconnects the dispensing line to the tap, during non-use of the beer dispensing system and a second position connects the dispensing line between the keg and the tap and disconnects the dispensing line to the drain line, during use of the beer dispensing system. A mounting base is mounted on and around the countertop for directing the dispensing line around the countertop for connection between the keg and the at least one tap, without passing through the countertop.

The above and other features of the invention will become readily apparent from the following detailed description thereof which is to be read in connection with the accompanying drawings.

DETAILED DESCRIPTION

Figure 1:
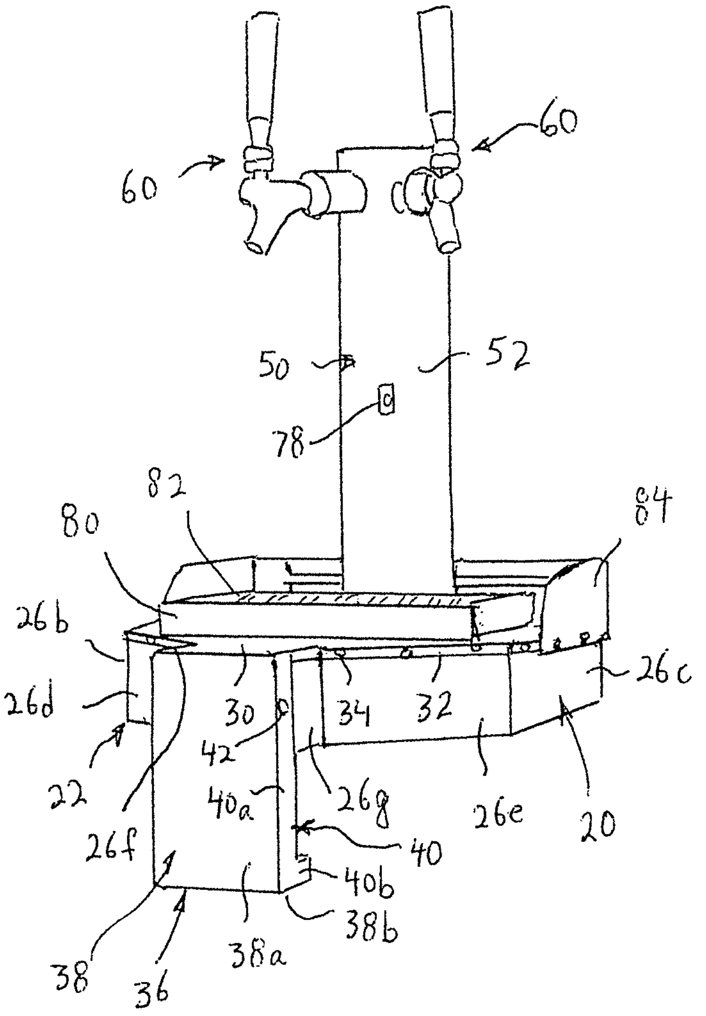
FIG. 1 is a front, top perspective view of a beer dispensing system according to the present invention.
Figure 2:
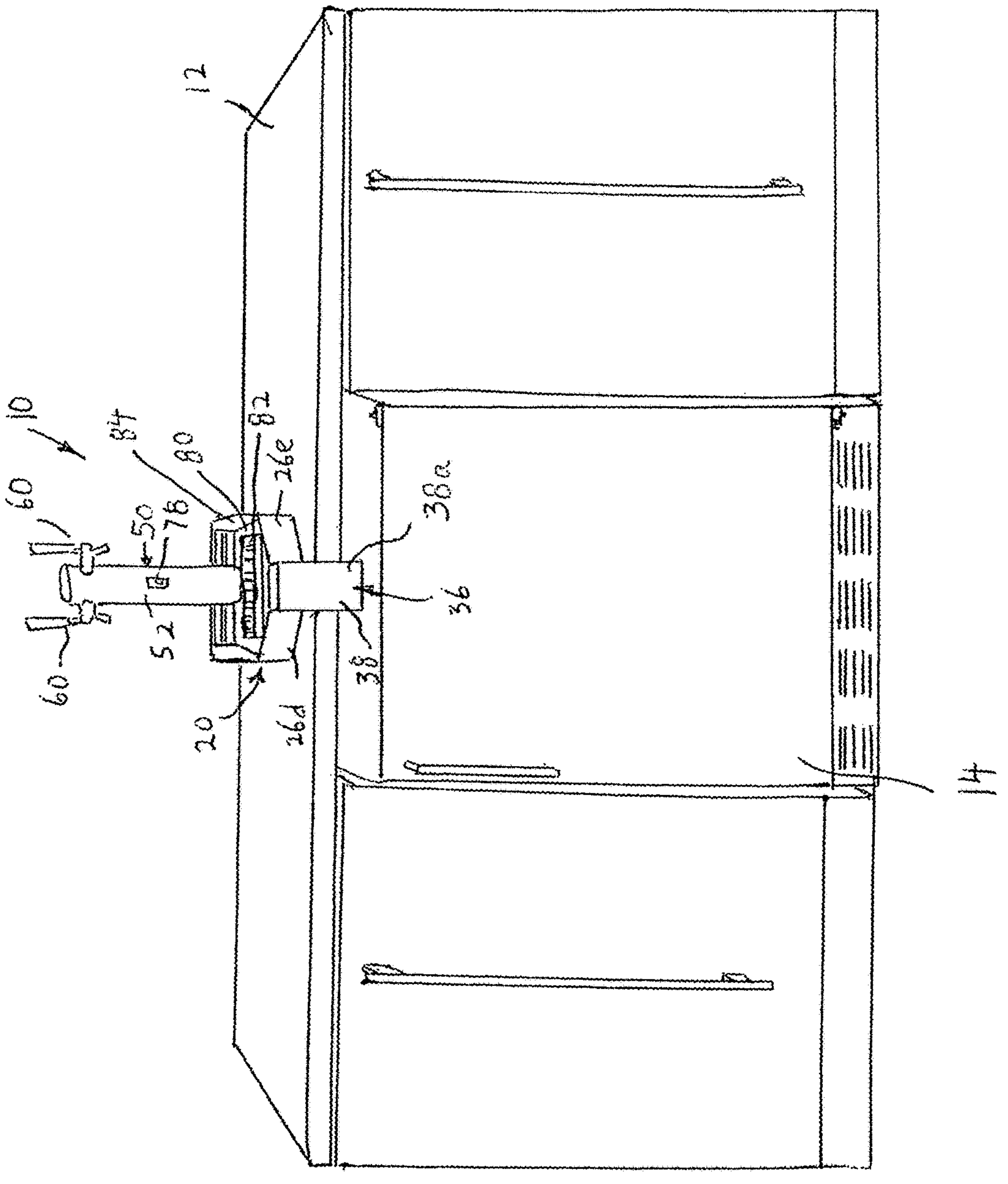
FIG. 2 is front, top perspective view of a beer dispensing system of FIG. 1, mounted on a countertop.

Referring to the drawings, there is shown a beer dispensing system 10 removably mounted on a countertop or bartop 12, in which a beer refrigerator or kegerator 14 is positioned below countertop 12 for chilling a keg 16 of beer held in a refrigerated chamber 15 therein.

Beer dispensing system 10 includes a mounting base 20 that seats on and fits around countertop 12. As shown, mounting base 20 includes an upper housing 22 that sits on top of countertop 12 and defines a chamber 24 therein. Upper housing 22 includes upstanding walls 26*a*-26*e* arranged as a five sided irregular pentagon, although the present invention is not limited to that shape. Specifically, upper housing 22 includes a rear wall 26*a* position near the rear of the countertop 12, two parallel side walls 26*b* and 26*c* connected to opposite ends of rear wall 26*a* and extending forwardly therefrom, and two inwardly angled walls 26*d* and 26*e* extending forwardly and inwardly from the opposite ends of side walls 26*b* and 26*c*. The free ends of inwardly angled walls 26*d* and 26*e* are spaced from each other. Upper housing 22 further includes parallel, spaced apart upstanding walls 26*f* and 26*g* extending forwardly from the free ends of inwardly angled walls 26*d* and 26*e*. A bottom wall 28 having the same footprint and dimensions of upstanding walls 26*a*-26*g* is connected with the lower ends of upstanding walls 26*a*-26*g*, although bottom wall 28 can be eliminated with the present invention as well. A top wall 30 having the same footprint and dimensions of upstanding walls 26*a*-26*g* is connected with the upper ends of upstanding walls 26*a*-26*g*. As a result, chamber 24 is defined between upstanding walls 26*a*-26*g*, bottom wall 28 and top wall 30.

Top wall 30 further includes a downwardly extending peripheral lip 32 therearound, which extends down and over the upper ends of upstanding walls 26*a*-26*g*, whereby top wall 30 is secured to upstanding walls 26*a*-26*g* by fastening elements 34, such as rivets or bolts extending through lip 32 and upstanding walls 26*a*-26*g*.

Mounting base 20 further includes a downwardly extending guide wall 36 including an L-shaped wall 38 having a planar, elongated rectangular wall 38*a* and a short inwardly directed rectangular stub wall 38*b* at the lower end thereof. Two L-shaped side walls 40 are connected to opposite edges of L-shaped wall 38, that is, each L-shaped side wall 40 includes a planar, elongated rectangular wall 40*a* connected with an edge of elongated rectangular wall 38*a* and extending inwardly therefrom, and a short inwardly directed rectangular stub wall 40*b* at the lower end thereof which is connected with an edge of inwardly directed rectangular stub wall 38*b*.

Guide wall 36 is positioned against the free edges of upstanding walls 26*f* and 26*g*, such that the top edge thereof is flush with top surface of top wall 30, and such that elongated rectangular walls 38*a* extend around the free edges of upstanding walls 26*f* and 26*g* and are secured thereto by fastening elements 42, such as rivets or bolts. With this arrangement, mounting base 20 seats on and fits around countertop 12 in a non-permanent manner, by positioning bottom wall 28 on the upper surface of countertop 12. In the case where there is no bottom wall 28, the lower edges of upstanding walls 26*a*-26*g* are positioned on the upper surface of countertop 12. The positioning is such that the free ends of upstanding walls 26*f* and 26*g* extend forwardly of the front edge of countertop 12.

In order to prevent sliding or any slight movement of mounting base 20 on countertop 12, a removable fastener (not shown) can be applied to the lower surface of bottom wall 28 and/or the upper surface of countertop 12. For example, hook and loop fastening strips commonly sold under the trademark VELCRO, can be applied to the upper surface of countertop 12 and the lower surface of bottom wall 28 to removably secure mounting base 20 to countertop 12. Alternatively, a double sided tape can be applied to either the upper surface of countertop 12 or the lower surface of bottom wall 28 for the same purpose. However, any other securing arrangement can be provided for removable attachment of mounting base 20 to countertop 12.

As a result, guide wall 36 extends downwardly in front of and below countertop 12, whereby stub walls 38*b* and 40*b* extend inwardly to a position toward a gap between the lower surface of countertop 12 and the upper end of kegerator 14 which is positioned below countertop 12.

The upper surface of top wall 30 includes a circular opening 30*a* (FIG. 4), and a beer dispensing tower 50 is mounted on the upper surface of top wall 30 in surrounding relation to circular opening 30*a*. Beer dispensing tower 50 includes a hollow, cylindrical housing 52 with an annular flange 54 at the lower end. A plurality of screw holes 56 are provided in spaced relation around annular flange 54. As a result, fastening elements 58, such as screws, are inserted through screw holes 56 into the upper surface of top wall 30, whereby hollow, cylindrical housing 52 extends upwardly from top wall 30 in coaxial relation to circular opening 30*a*.

As is well known, at least one dispensing faucet or tap 60 is connected at the upper end of hollow, cylindrical housing 52 for dispensing beer therefrom. In the present drawings, two dispensing faucets 60 are shown, although the present invention is not limited to this number.

Figure 4:
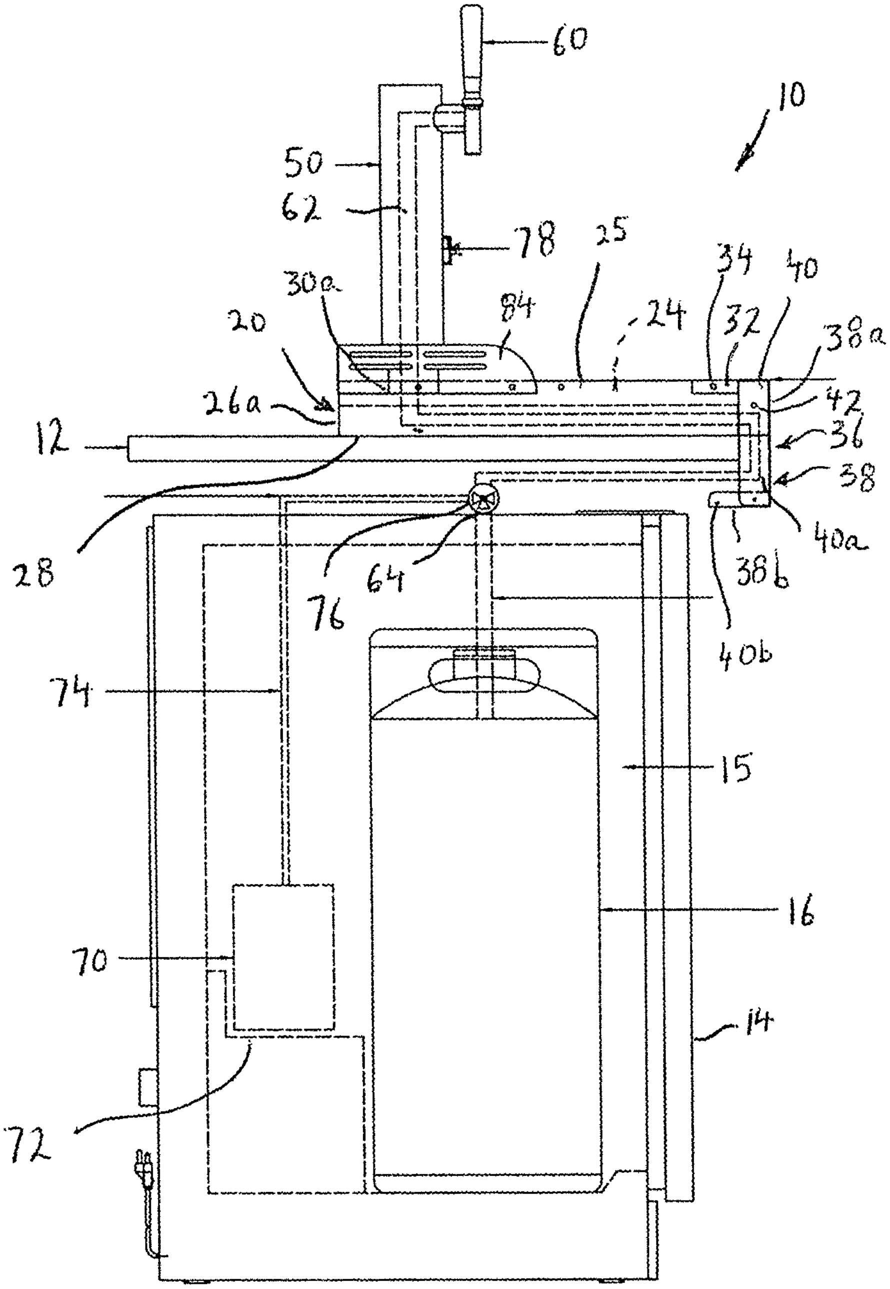
FIG. 4 is a side elevational view, partly in phantom, of the beer dispensing system of FIG. 1.

In this regard, at least one dispensing line 62 comprised of a long length of tube is connected between the keg 16 and the dispensing faucets 60. As best shown in FIG. 4, each dispensing line 62 extends from a dispensing faucet 60, down through hollow, cylindrical housing 52, through chamber 24, down behind guide wall 36 and into a sealed opening 64 in the upper surface of kegerator 14 (as is well known) and connected with keg 16 therein. Preferably, foam insulation 25 or other suitable insulation is provided in chamber 24 to maintain the cold temperature of the beer, and holes are cut therein to snake dispensing line 62 therethrough.

It is well known that carbon dioxide or nitrogen is used to pressurize the beer in the keg. As a result, when tap 60 is actuated, dispensing line 62 is opened between keg 16 and tap 60. At such time, the carbon dioxide or nitrogen presses the beer out of keg 16. At the same time, as is well known, more gas flows into keg 16 to replace the beer flowing out, so that air never enters keg 16. Because of this arrangement, the beer flows out of tap 60.

With the above arrangement, it will be appreciated that because beer dispensing system 10 is not permanently attached or secured in any manner to countertop 12, it can be removed at any time, rendering countertop 12 usable for other appliances or other uses at a later time. Further, there is no need to provide an drilling through countertop 12.

Further, as discussed above, in household systems that do not have a separate cooling arrangement for dispensing line 62, after beer has been dispensed, beer remains in dispensing line 62 between keg 16 and faucet or tap 60, at room temperature. As a result, the beer remaining in dispensing line 62 between dispensing intervals, can become spoiled, that is, become excessively foamy and warm, and can have a build up of bacteria. As a result, during the next activation of tap 60 after an interval of non-use, spoiled beer from dispensing line 62 is dispensed. As a result, it is generally necessary to discard an initial batch of spoiled beer which is dispensed after an interval of non-use. This results in a waste of beer and energy. However, since it is not clear after activating the tap when all spoiled beer has been discarded, it is necessary to discard additional beer. This results in additional unspoiled beer being discarded as well, which results in a waste of beer and energy.

The present invention provides an arrangement to avoid this problem.

Specifically, as shown best in FIG. 4, a secondary container 70 is provided within kegerator 14, preferably on a shelf 72 therein. A drain line 74 comprised of a length of tube is connected at one end to secondary container 70 and at its opposite end to a three way ball valve 76 connected with dispensing line 62 at a position where it exits kegerator 14. A manual switch 78 is provided on beer dispensing tower 50 for controlling ball valve 76. Manual switch 78 can be wired directly to ball valve 76 or can be arranged to transmit a signal which is received by ball valve 76.

With this arrangement, in one position, ball valve 78 is controlled to close drain line 74 so that any flow of beer will be from kegerator 14 to tap 60 when tap 60 is actuated. However, when there has been an interval of non-use, during a next use, ball valve 78 is controlled to close the connection of dispensing line 62 with keg 14, and instead, to open a connection between dispensing line 62 and drain line 74. As a result, any spoiled beer in dispensing line 74 is automatically drained to secondary container 70 without dispensing additional unspoiled beer, that is, only the spoiled beer is discarded into the secondary container.

It will be appreciated that, generally, draining of drain line 74 into secondary container 70 occurs a short time after use of beer dispensing system 10 has ceased, so that the beer in secondary container 70 is not spoiled, and can be consumed, resulting in less waste.

Thereafter, switch 78 is again actuated to control ball valve 78 to close drain line 74 and again connected keg 14 to tap 60 through dispensing line 62. In such case, switch 78 can be a mere toggle switch.

Beer dispensing system 10 allows the consumer to build in a standard size beer kegerator 14 under a countertop 12, and snake the tubing of dispensing line 62 around countertop 12, using the uniquely shaped mounting base 20, and run the tubing of dispensing line 62 through tower 50 to faucet or tap 60.

Since the tight space restriction in this household unit precludes the use of a line chilling system as is found in commercial establishments, beer dispensing system 10 keeps beer dispensing line 62 purged as follows.

When beer serving is paused for short or long intervals, an electrically activated ball valve 76 is activated by switch 78 on tower 50, which closes beer dispensing line 62 to faucet 60, and opens drain line 74, allowing beer to gravity drain into secondary container 70 inside kegerator 14. When serving again, valve 76 is controlled again by switch 78 to open, and the carbon dioxide forces the beer from the refrigerated keg 14 to faucet 60.

Figure 3:
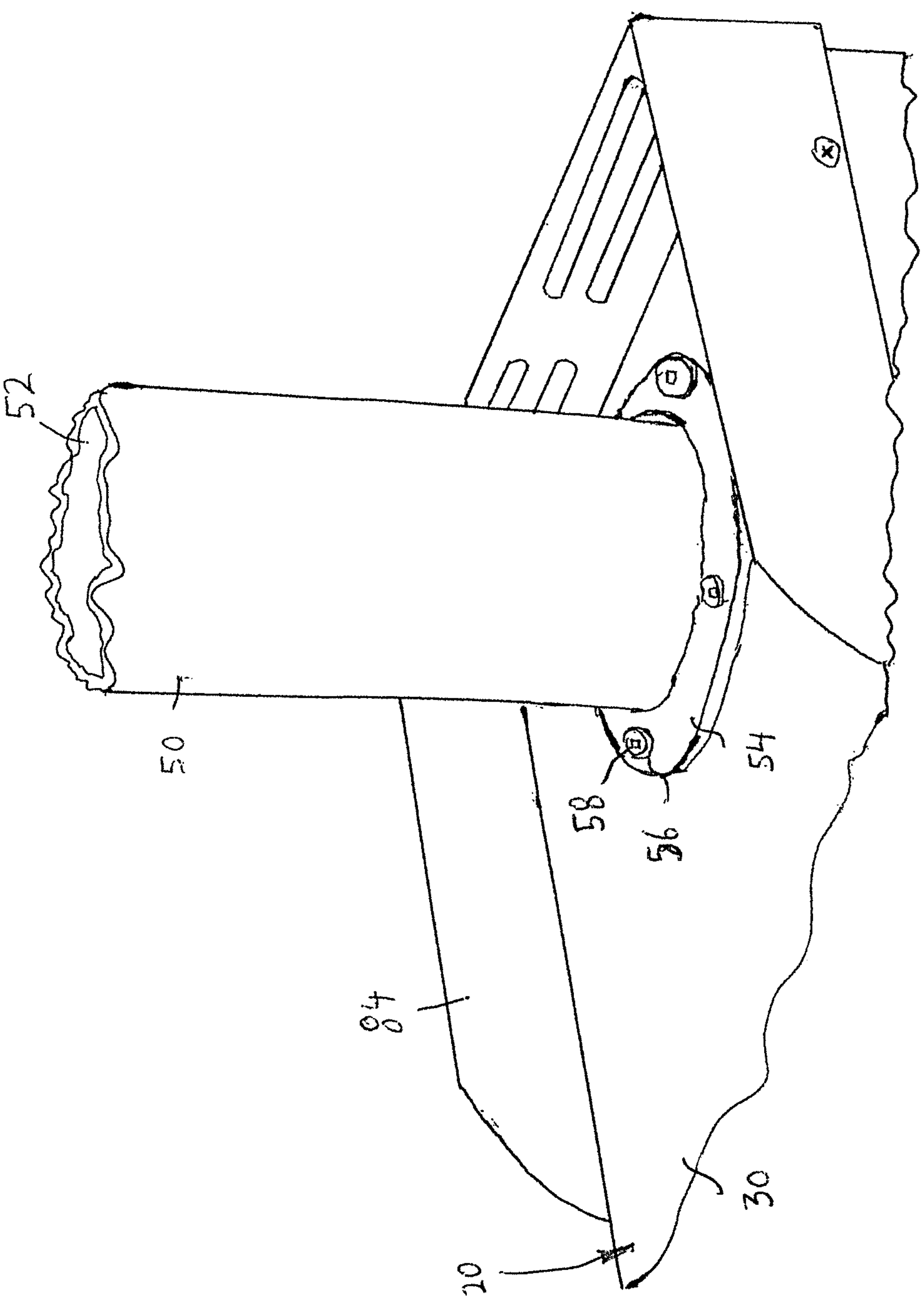
FIG. 3 is an enlarged view of a portion of the mounting base.

As an alternative, instead of a manually activated switch 78, ball valve 76 can be switched with an automatic timer. For example, after a predetermined interval of non-use of dispensing beer, ball valve 76 can be automatically switched to automatically connect dispensing line 62 to drain line 74 for a period of time sufficient to drain the spoiled beer from dispensing line 62, and then, after a short predetermined time, automatically close drain line 74 and reconnect dispensing line 62 between keg 14 and tap 60. In addition, a spillover collector 80 can be removably positioned on top wall 30. Spillover collector 80 includes a hollow interior chamber and an upper surface with openings 82, whereby any spillover beer from tap 60 falls into spillover container 80, and can be later removed. Spillover collector 80 is omitted from FIG. 3 for clarity purposes.

Further, it is preferable that a containment fence 84 extend upwardly from and be connected with the upper surfaces of rear wall 26*a* and side walls 26*b* and 26*c*.

Having described a specific preferred embodiment of the invention with reference to the accompanying drawings, it will be appreciated that the present invention is not limited to that precise embodiments and that various changes and modifications can be effected therein by one of ordinary skill in the art without departing from the scope or spirit of the invention as defined by the appended claims.

What is claimed is:

1. A beer dispensing system comprising:

a refrigerated chamber for holding a keg of beer, wherein the refrigerated chamber is positioned below a countertop;

a beer tower having at least one tap for dispensing the beer from the keg, wherein the beer tower is positioned above the countertop;

a dispensing line extending between the keg in the refrigerated chamber and the at least one tap for supplying beer from the keg to the tap; and a mounting base mounted on the countertop for directing the dispensing line around the countertop for connection between the keg and the at least one tap, without passing through the countertop, wherein the mounting base includes a hollow upper housing that sits on top of the countertop and a guide wall downwardly extending from the upper housing at an edge of the countertop for guiding the dispensing line around the countertop, and wherein the guide wall is an L-shaped wall that guides the dispensing line from the upper housing, down around the edge of the countertop and toward a gap between the refrigerated chamber and a lower surface of the countertop.

2. A beer dispensing system according to claim 1, further comprising:

a drain line for draining beer in the dispensing line during non-use of the beer dispensing system; and a valve which selectively provides connections between:

a first position which connects the dispensing line to the drain line and disconnects the dispensing line to the tap, during non-use of the beer dispensing system and a second position which connects the dispensing line between the keg and the tap and disconnects the dispensing line to the drain line, during use of the beer dispensing system.

3. A beer dispensing system according to claim 2, wherein the valve is a three way ball valve.

4. A beer dispensing system according to claim 2, further including a switch for electronically controlling movement of the valve between the first and second positions.

5. A beer dispensing system according to claim 4, wherein the switch is positioned on the beer tower.

6. A beer dispensing system according to claim 4, wherein the switch is wired directly to the ball valve for controlling the position of the ball valve between the first and second positions.

7. A beer dispensing system according to claim 4, wherein the switch is arranged to transmit a signal to be received by the ball valve for controlling the position of the ball valve between the first and second positions.

8. A beer dispensing system according to claim 4, wherein the valve is connected to the dispensing line at a position where the dispensing line immediately exits the refrigerated chamber.

9. A beer dispensing system according to claim 2, further including a secondary container positioned in the refrigerated chamber and connected with the drain line for receiving beer discarded from the dispensing line to the drain line.

10. A beer dispensing system according to claim 1, wherein the upper housing includes a top wall having an opening therein, and the beer tower is positioned on and secured to the top wall in surrounding relation and in open communication with the opening.

11. A beer dispensing system according to claim 1, wherein the mounting base is not secured to the countertop.

* * * * *